US010411800B2

(12) United States Patent
Miyamoto (10) Patent No.: US 10,411,800 B2
(45) Date of Patent: Sep. 10, 2019

(54) INFORMATION PROCESSING APPARATUS, INFORMATION PROCESSING METHOD, AND NON-TRANSITORY RECORDING MEDIUM (71) Applicant: CASIO COMPUTER CO., LTD., Shibuya-ku, Tokyo (JP)

(72) Inventor: Naotomo Miyamoto, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/960,954

(22) Filed: Apr. 24, 2018

(65) Prior Publication Data
US 2018/0323872 A1 Nov. 8, 2018

(30) Foreign Application Priority Data

May 2, 2017 (JP) .................................. 2017-091530

(51) Int. Cl.
*H04B 10/116* (2013.01)
*G06F 3/147* (2006.01)
*G06T 3/40* (2006.01)

(52) U.S. Cl.
CPC .......... *H04B 10/116* (2013.01); *G06F 3/147* (2013.01); *G06T 3/40* (2013.01); *G09G 2340/04* (2013.01); *G09G 2340/12* (2013.01)

(58) Field of Classification Search
CPC .............................. H04B 10/116; G06T 3/40
See application file for complete search history.

(56) References Cited

U.S. PATENT DOCUMENTS

2015/0317766 A1* 11/2015 Naganawa ................ G06T 3/40
345/668
2017/0071571 A1* 3/2017 Lee ........................ A61B 8/465
2017/0302862 A1* 10/2017 Shintani ............... G06T 7/0002

FOREIGN PATENT DOCUMENTS

JP 2010147527 A 7/2010

* cited by examiner

Primary Examiner — Ryan R Yang
(74) Attorney, Agent, or Firm — Holtz, Holtz & Volek PC (57) ABSTRACT An image area detector detects a high-luminance image area having a luminance value equal to or higher than a predetermined value, having a size equal to or larger than a predetermined size, and including two or more high-luminance subject images disposed adjacent to or overlapping with each other, from an input image frame. The enlargement controller controls the detected high-luminance image area to be enlarged and displayed. If any instruction to designate a subarea within a rectangular border surrounding the enlarged high-luminance image area is provided from the user, the position coordinate setter converts the coordinates of the subarea into the coordinates before the enlargement, and stores the converted coordinates into the memory as the coordinates of the LED serving as a light source that transmits information.

11 Claims, 7 Drawing Sheets

INFORMATION PROCESSING APPARATUS, INFORMATION PROCESSING METHOD, AND NON-TRANSITORY RECORDING MEDIUM

CROSS-REFERENCE TO RELATED APPLICATION

This application claims the benefit of Japanese Patent Application No. 2017-091530, filed on May 2, 2017, the entire disclosure of which is incorporated by reference herein.

FIELD

This application relates to an information processing apparatus, an information processing method, and a non-transitory recording medium.

BACKGROUND

As is disclosed in Unexamined Japanese Patent Application Kokai Publication No. 2010-147527, a technique based on visible light communication has been developed that involves causing a camera to take images of a light source (information light source), such as a marker, which is disposed at each site in a building and transmits information via visible light communication, and then decoding the taken images into information.

SUMMARY

An information processing apparatus according to a first aspect of the disclosure includes: an image input unit that inputs an image; a display; and a processor. The processor: enlarges an image area having a predetermined luminance value in the image input by the image input unit and controls the display to display the enlarged image area; designates any subarea included in the enlarged image area displayed on the display; acquires position coordinates of the designated subarea; converts the acquired position coordinates of the subarea into position coordinates of the image area having the predetermined luminance value before enlargement; sets the converted position coordinates as position coordinates of a light source that transmits information via visible light communication; and decodes a variation in luminance in the set position coordinates into the information transmitted via the visible light communication.

An information processing method according to a second aspect of the disclosure includes: an image input step of inputting an image; a display control step of enlarging an image area having a predetermined luminance value in the image input in the image input step and controlling a display to display the enlarged image area; a designation step of designating any subarea included in the enlarged image area displayed on the display in the display control step; a position coordinate acquisition step of acquiring position coordinates of the subarea designated in the designation step; a position coordinate setting step of converting the position coordinates of the subarea acquired in the position coordinate acquisition step into position coordinates of the image area having the predetermined luminance value before enlargement, and setting the converted position coordinates as position coordinates of a light source that transmits information via visible light communication; and a decoding step of decoding a variation in luminance in the position coordinates set in the position coordinate setting step into the information transmitted via the visible light communication.

A non-transitory computer-readable recording medium according to a third aspect of the disclosure stores a program thereon. The program causes a computer to execute inputting an image; enlarging an image area having a predetermined luminance value in the image input and controlling the enlarged image area to be displayed; designating any subarea included in the enlarged image area; acquiring position coordinates of the subarea; converting the position coordinates of the subarea into position coordinates of the image area having the predetermined luminance value before enlargement, and setting the converted position coordinates as position coordinates of a light source that transmits information via visible light communication; and decoding a variation in luminance in the position coordinates into the information transmitted via for the visible light communication.

BRIEF DESCRIPTION OF THE DRAWINGS

A more complete understanding of this application can be obtained when the following detailed description is considered in conjunction with the following drawings, in which.

DETAILED DESCRIPTION

An information processing apparatus according to embodiments of the disclosure will now be described with reference to the following drawings.

Figure 1:
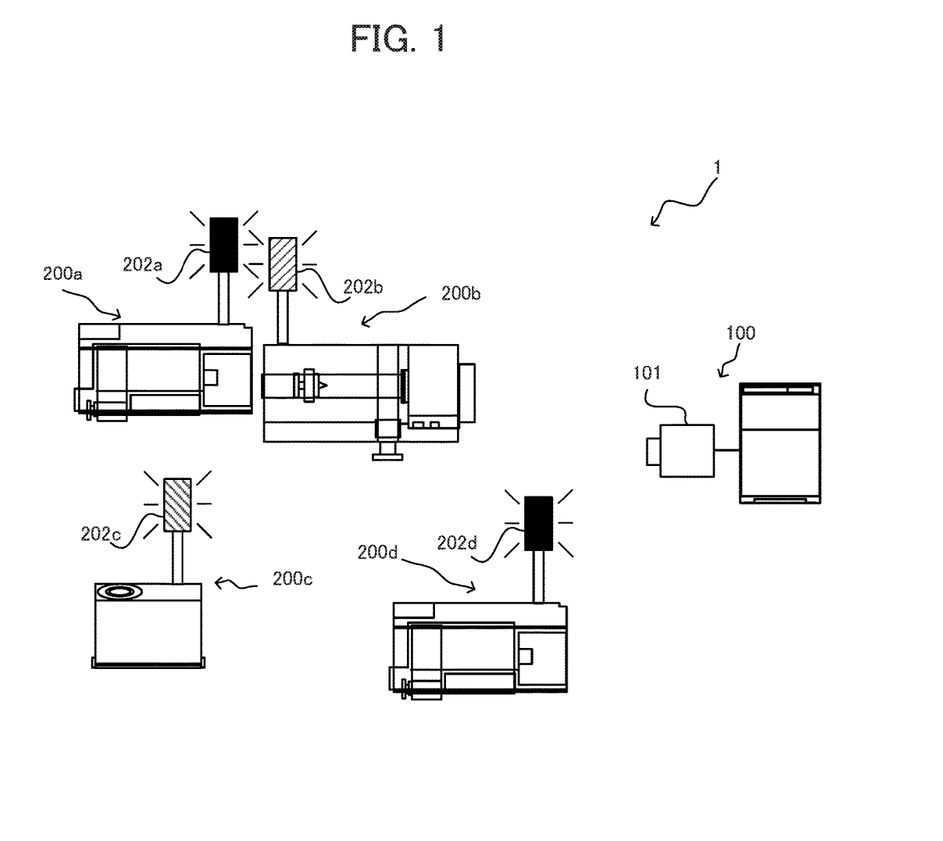
FIG. 1 illustrates an exemplary configuration of a visible light communication system according to an embodiment of the disclosure.

FIG. 1 illustrates an exemplary configuration of a visible light communication system 1 including an information processing apparatus. With reference to FIG. 1, the visible light communication system 1 includes an information processing apparatus 100, and monitoring target apparatuses 200a, 200b, 200c, and 200d (hereinafter collectively referred to as "monitoring target apparatuses 200" if the monitoring target apparatuses 200a, 200b, 200c, and 200d need not to be distinguished from each other). The information processing apparatus 100 is equipped with an imager 101. The monitoring target apparatus 200a includes a light emitting diode (LED) 202a, the monitoring target apparatus 200b includes an LED 202b, the monitoring target apparatus 200c includes an LED 202c, and the monitoring target apparatus 200d includes an LED 202d (the LEDs 202a, 202b, 202c, and 202d are hereinafter collectively referred to as "LEDs 202" if these LEDs need not to be distinguished from each other).

In the embodiment, the LEDs 202 in the monitoring target apparatuses 200 each emit light corresponding to information to be transmitted via visible light communication, and thereby transmit the information. The information processing apparatus 100 takes images with the imager 101, and then acquires the transmitted information from images of light included in the taken images.

Figure 2:
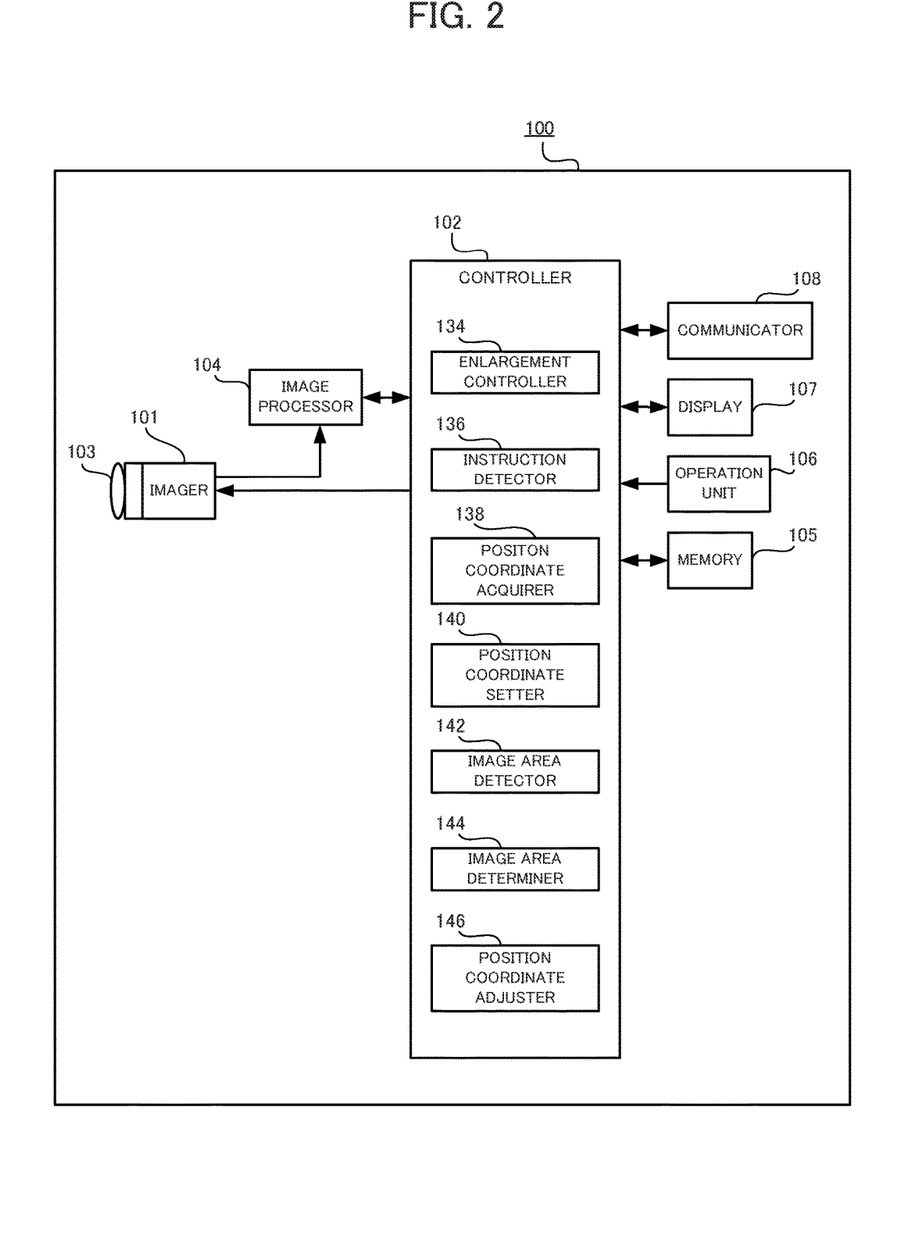
FIG. 2 illustrates an exemplary configuration of an information processing apparatus according to the embodiment.

FIG. 2 illustrates an exemplary configuration of the information processing apparatus 100. With reference to FIG. 2, the information processing apparatus 100 includes the imager 101, a controller 102, an image processor 104, a memory 105, an operation unit 106, a display 107, and a communicator 108.

The imager 101 is equipped with a lens 103. The lens 103 is composed of a zoom lens, for example. The lens 103 moves in response to a zooming operation from the operation unit 106 and a focusing control by the controller 102. The movement of the lens 103 controls the angle of view of the imager 101 and optical images captured by the imager 101.

The imager 101 includes multiple light receiving elements arranged in a regular two dimensional array on the light receiving surface. The light receiving elements are each composed of an imaging device, such as a charge coupled device (CCD) or a complementary metal oxide semiconductor (CMOS). The imager 101 performs capturing (light receiving) of an optical image incident through the lens 103 in predetermined imaging cycles (for example, the cycles twice as long as the light emitting cycles of the LEDs 202) in a predetermined range of angle of view during a predetermined exposure time, in accordance with a control signal from the controller 102. The image 101 then converts an image signal within the angle of view into digital data to generate an image frame. In the image frame, the pixels each have data containing luminance (brightness), hue, and chroma values. The imager 101 takes an image and generates an image frame sequentially in time, and outputs successive image frames to the image processor 104.

The image processor 104 outputs the image frame (digital data) received from the imager 101 to the controller 102, in accordance with a control signal from the controller 102. In response to input of a control signal based on a storage instruction from the operation unit 106, the image processor 104 codes and files an optical image within the angle of view of the imager 101 or within the screen of the display 107 at the time of the storage instruction, based on a compression coding scheme, such as a joint photographic experts group (JPEG) format.

The controller 102 includes a central processing unit (CPU), for example. The controller 102 executes software processes in accordance with programs (for example, a program allowing the information processing apparatus 100 to execute the below-explained process illustrated in FIGS. 9 and 10) stored in the memory 105, and thereby controls various functions of the information processing apparatus 100.

The memory 105 is composed of, for example, a random access memory (RAM) or a read only memory (ROM). The memory 105 stores various information, such as programs, to be used in controls and other operations in the information processing apparatus 100.

The operation unit 106 is composed of, for example, a touch panel disposed on the top surface of the display 107, and serves as an interface for input of an operation of a user.

The display 107 is composed of, for example, a liquid crystal display (LCD), a plasma display panel (PDP), or an electroluminescence (EL) display. The controller 102 outputs an image signal corresponding to the image frame received from the imager 101, to the display 107. The display 107 then displays an image in accordance with the image signal received from the controller 102. The communicator 108 is composed of, for example, a local area network (LAN) card. The communicator 108 communicates with external communication apparatuses.

The controller 102 includes an enlargement controller 134, an instruction detector 136, a position coordinate acquirer 138, a position coordinate setter 140, an image area detector 142, an image area determiner 144, and a position coordinate adjuster 146.

Figure 3:
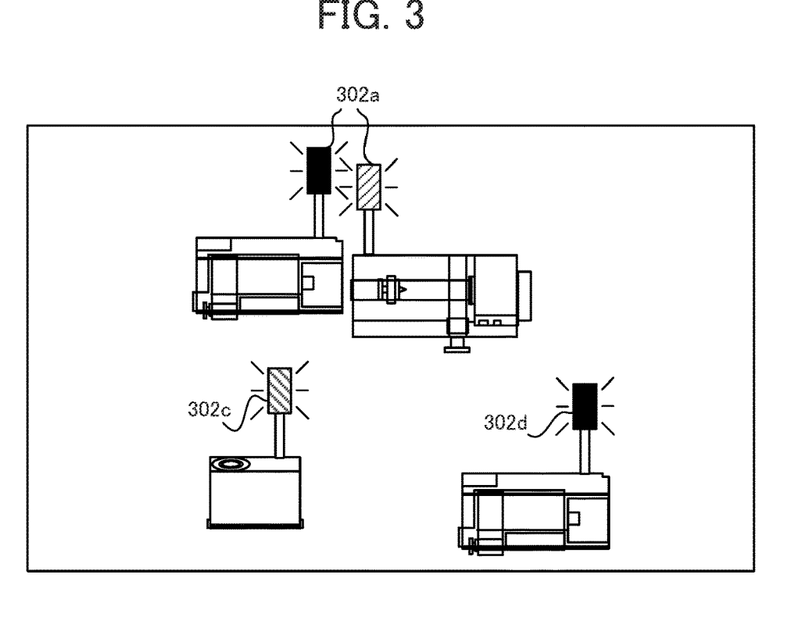
FIG. 3 illustrates an exemplary phase of transition of an image according to the embodiment.

The image area detector 142 detects image areas (high-luminance image areas) each having a luminance (brightness) value equal to or higher than a predetermined value in the image frame received from the image processor 104. For example, in the image illustrated in FIG. 3, the image area detector 142 detects a high-luminance image area 302a corresponding to the LEDs 202a and 202b, a high-luminance image area 302c corresponding to the LED 202c, and a high-luminance image area 302d corresponding to the LED 202d. In the embodiment, the LEDs 202a and 202b are adjacent to each other in the image frame. The image area detector 142 thus detects a single high-luminance image area 302a corresponding to both of the LEDs 202a and 202b.

Figure 4:
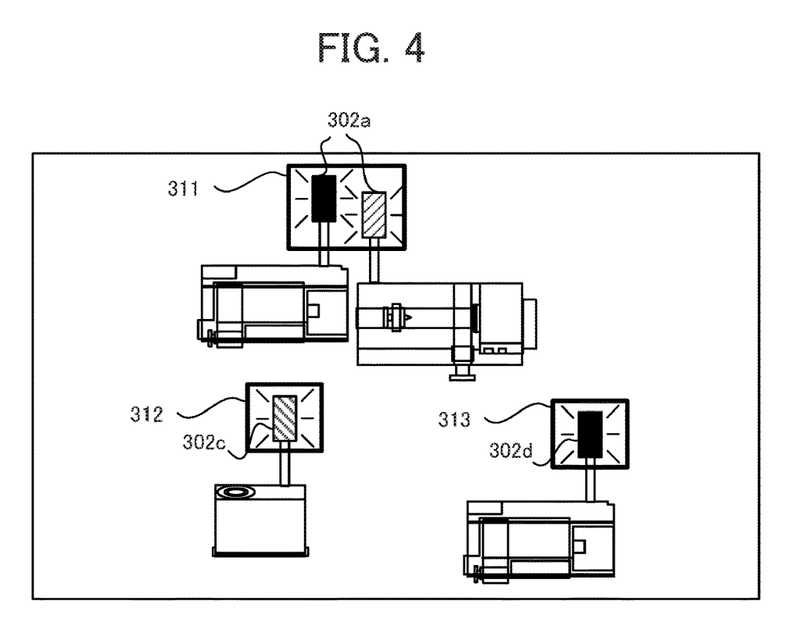
FIG. 4 illustrates another exemplary phase of transition of the image according to the embodiment.

The image area detector 142 then superimposes rectangular borders surrounding the respective detected high-luminance image areas on the image displayed on the display 107. For example, with reference to FIG. 4, the image area detector 142 superimposes rectangular borders 311, 312, and 313 surrounding the high-luminance image areas 302a, 302c, and 302d, respectively, on the image.

The image area detector 142 then determines whether the detected high-luminance image areas are equal to or larger than a predetermined size. For a high-luminance image area smaller than the predetermined size, the image area detector 142 determines whether the high-luminance image area has a predetermined shape. In the embodiment, the image area detector 142 determines whether the high-luminance image area is rectangular, because each of the LEDs 202 is rectangular. For a high-luminance image area having the predetermined shape, the position coordinate setter 140 stores the coordinates of the high-luminance image area in the image frame (coordinate plane) into the memory 105, as the coordinates (position coordinates) of the LEDs 202 serving as a light source that transmits information.

For a high-luminance image area equal to or larger than the predetermined size, the image area determiner 144 determines whether the high-luminance image area includes two or more high-luminance subject images disposed adjacent to or overlapping with each other. In the embodiment, the image area determiner 144 determines a non-rectangular high-luminance image area to include two or more high-luminance subject images disposed adjacent to or overlapping with each other, because each of the LEDs 202 is rectangular. For example, in FIG. 4, the high-luminance image area 302a includes two rectangular shapes that cannot be regarded as a single rectangular. The image area determiner 144 thus determines that the high-luminance image area 302a includes two or more high-luminance subject images disposed adjacent to or overlapping with each other.

Figure 5:
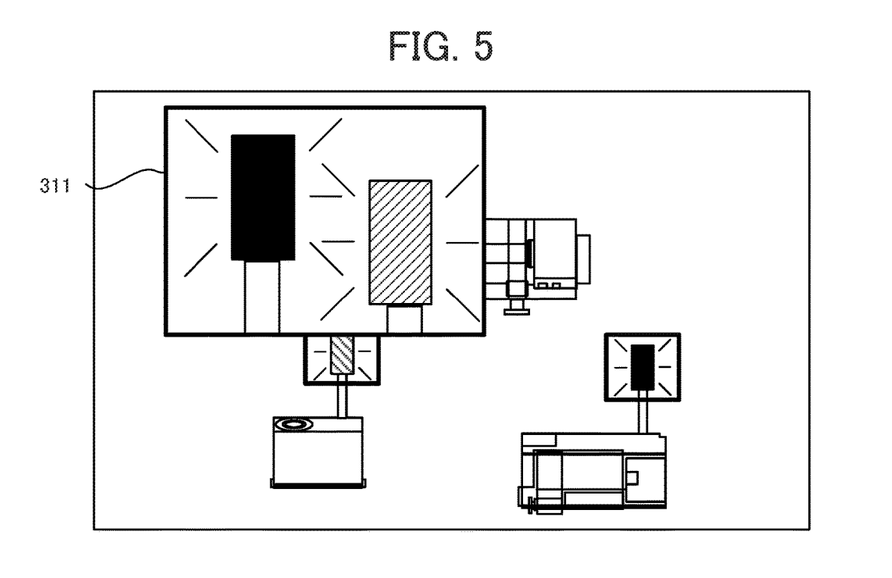
FIG. 5 illustrates another exemplary phase of transition of the image according to the embodiment.

The enlargement controller 134 enlarges the high-luminance image area, determined to include two or more high-luminance subject images disposed adjacent to or overlapping with each other, and controls the display 107 to display the enlarged high-luminance image area. In specific, the enlargement controller 134 sets the region within the rectangular border surrounding the high-luminance image area, determined to include two or more high-luminance subject images disposed adjacent to or overlapping with each other, to be an enlargement target region. The enlargement controller 134 then enlarges the region within the rectangular border and superimposes the enlarged region on the image displayed on the display 107. For example, in FIG. 4, since the high-luminance image area 302*a* is determined to include two or more high-luminance subject images disposed adjacent to or overlapping with each other, the region within the rectangular border 311 surrounding the high-luminance image area 302*a* is set to be the enlargement target region, and then enlarged and displayed as illustrated in FIG. 5.

Figure 6:
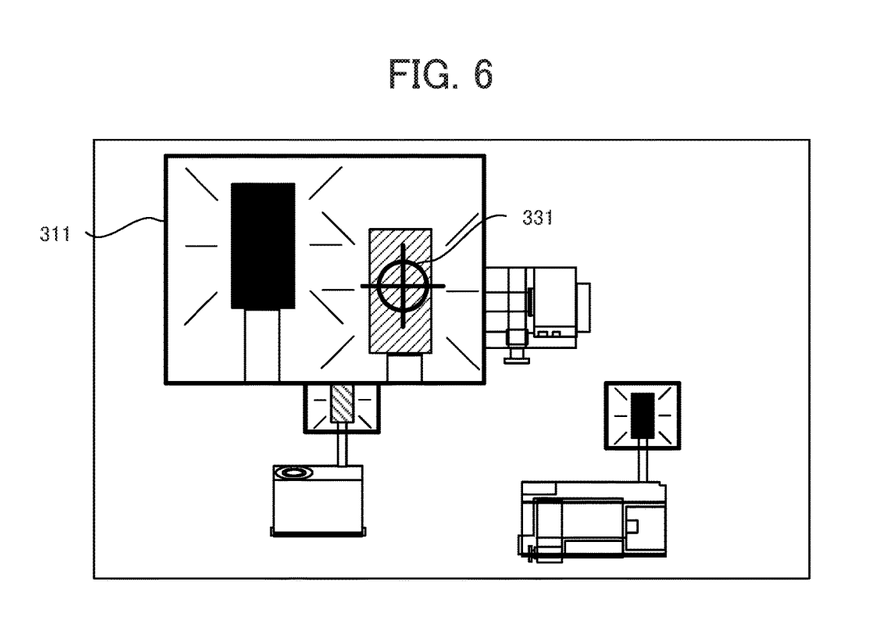
FIG. 6 illustrates another exemplary phase of transition of the image according to the embodiment.
Figure 7:
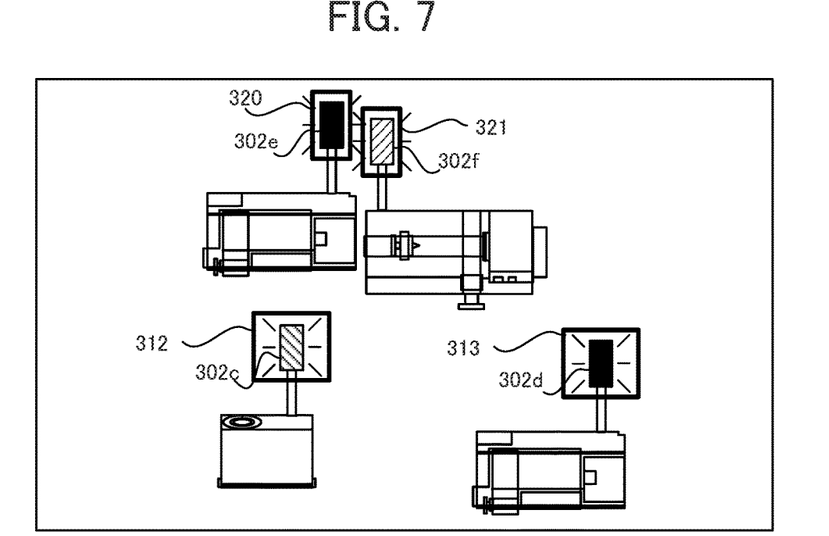
FIG. 7 illustrates another exemplary phase of transition of the image according to the embodiment.

During the enlargement of the region within the rectangular border surrounding the high-luminance image area, the instruction detector 136 determines whether any subarea is designated within the rectangular border by an operation of the user to the operation unit 106. If any subarea is designated within the rectangular border, the image area detector 142 recognizes the designated subarea as a new high-luminance image area, and superimposes a new rectangular border surrounding the new high-luminance image area on the image displayed on the display 107. For example, with reference to FIG. 6, a cursor 331 moves in accordance with an operation of the user to the operation unit 106. Then, in response to a predetermined designation operation, a subarea corresponding to the position of the cursor 331 is designated. The designated subarea is recognized as a new high-luminance image area. For example, with reference to FIG. 7, subareas corresponding to high-luminance image areas 302*e* and 302*f* are designated, and new rectangular borders 320 and 321 are displayed surrounding the high-luminance image areas 302*e* and 302*f*, respectively.

The position coordinate acquirer 138 acquires the coordinates of the designated subarea in the image frame (coordinate plane). The coordinates of the subarea indicates, for example, the coordinates of the center of the new rectangular border. The position coordinate setter 140 then converts the acquired coordinates by the position coordinate acquirer 138 into the coordinates before the enlargement of the region within the rectangular border surrounding the high-luminance image area. For example, in the case where coordinates (a1, b1) were converted into coordinates (a2, b2) by the enlargement, the position coordinate setter 140 converts the coordinates (a2, b2) into the coordinates (a1, b1).

The position coordinate setter 140 stores the converted coordinates into the memory 105, as the coordinates (position coordinates) of the LEDs 202 serving as a light source that transmits information.

Figure 8:
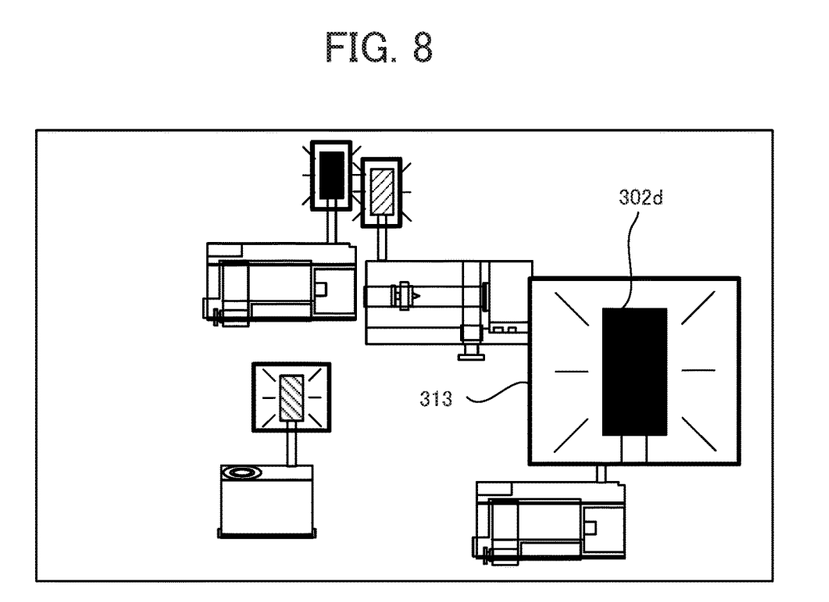
FIG. 8 illustrates another exemplary phase of transition of the image according to the embodiment.

In response to an instruction to enlarge the high-luminance image area by an operation of the user to the operation unit 106, the enlargement controller 134 enlarges the high-luminance image area and controls the enlarged high-luminance image area to be displayed. In specific, the enlargement controller 134 sets the region within the rectangular border surrounding the designated high-luminance image area to be an enlargement target region. The enlargement controller 134 enlarges the region within the rectangular border and then superimposes the enlarged region on the image displayed on the display 107. For example, with reference to FIG. 8, the region within the rectangular border 313 surrounding the high-luminance image area 302*d* is enlarged.

After the enlargement of the high-luminance image area, in response to an instruction to adjust the position and size of the rectangular border by an operation of the user to the operation unit 106, the image area detector 142 modifies the rectangular border in accordance with the instruction, and superimposes the modified rectangular border on the image displayed on the display 107. The position coordinate adjuster 146 then adjusts the position coordinates in accordance with the modification of the rectangular border. For example, the adjusted position coordinates are the coordinates of the center of the modified rectangular boarder.

After the storage of the coordinates (position coordinates) of the LEDs 202 serving as a light source that transmits information into the memory 105 as described above, the controller 102 acquires information corresponding to the stored position coordinates. In specific, the controller 102 controls bit data strings to be decoded from a variation in hue or luminance values in the stored position coordinates in image frames received sequentially in time, and thus acquires the transmitted information.

Figure 9:
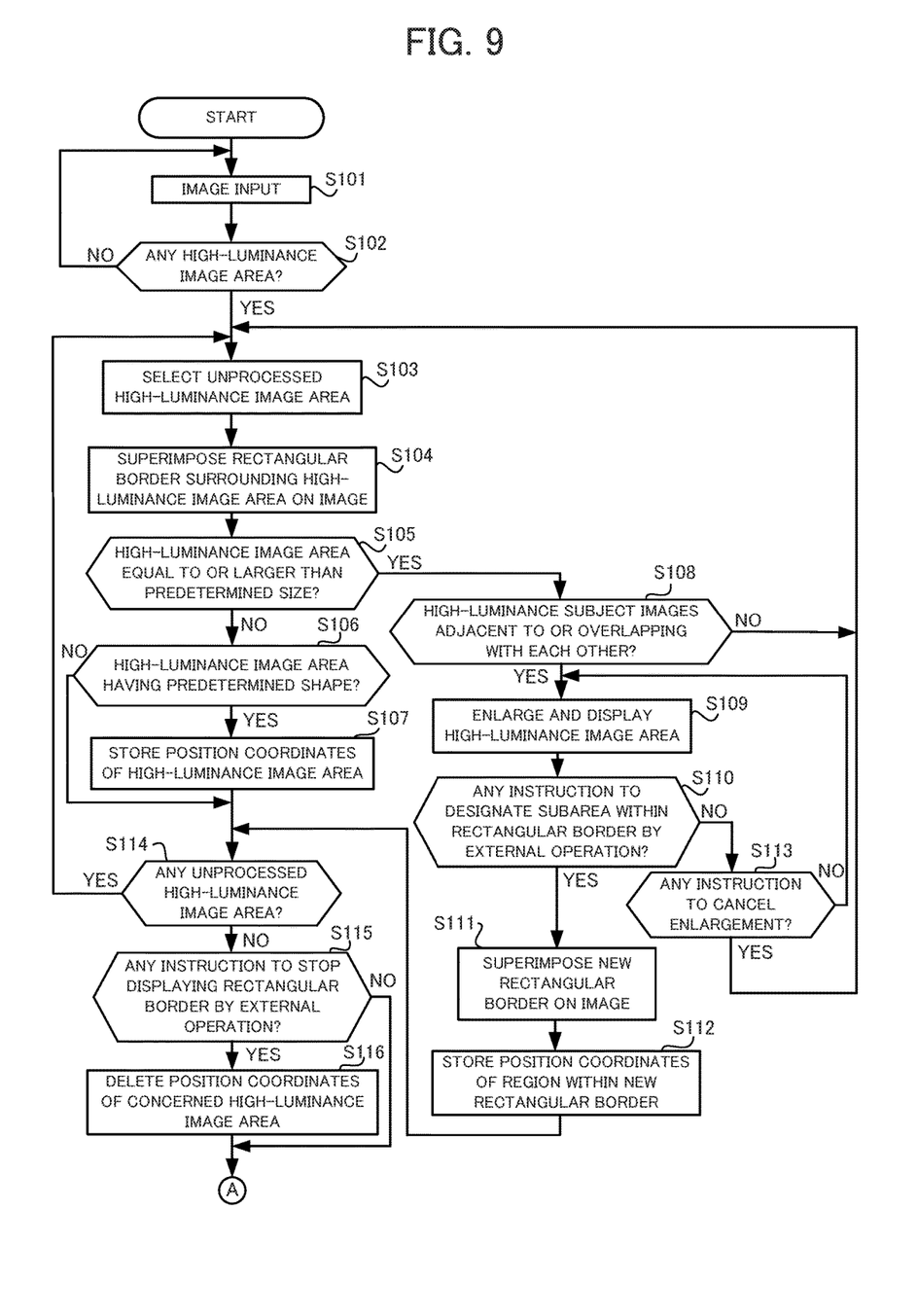
FIG. 9 is a flowchart illustrating an exemplary position coordinate setting process executed in the information processing apparatus according to the embodiment.
Figure 10:
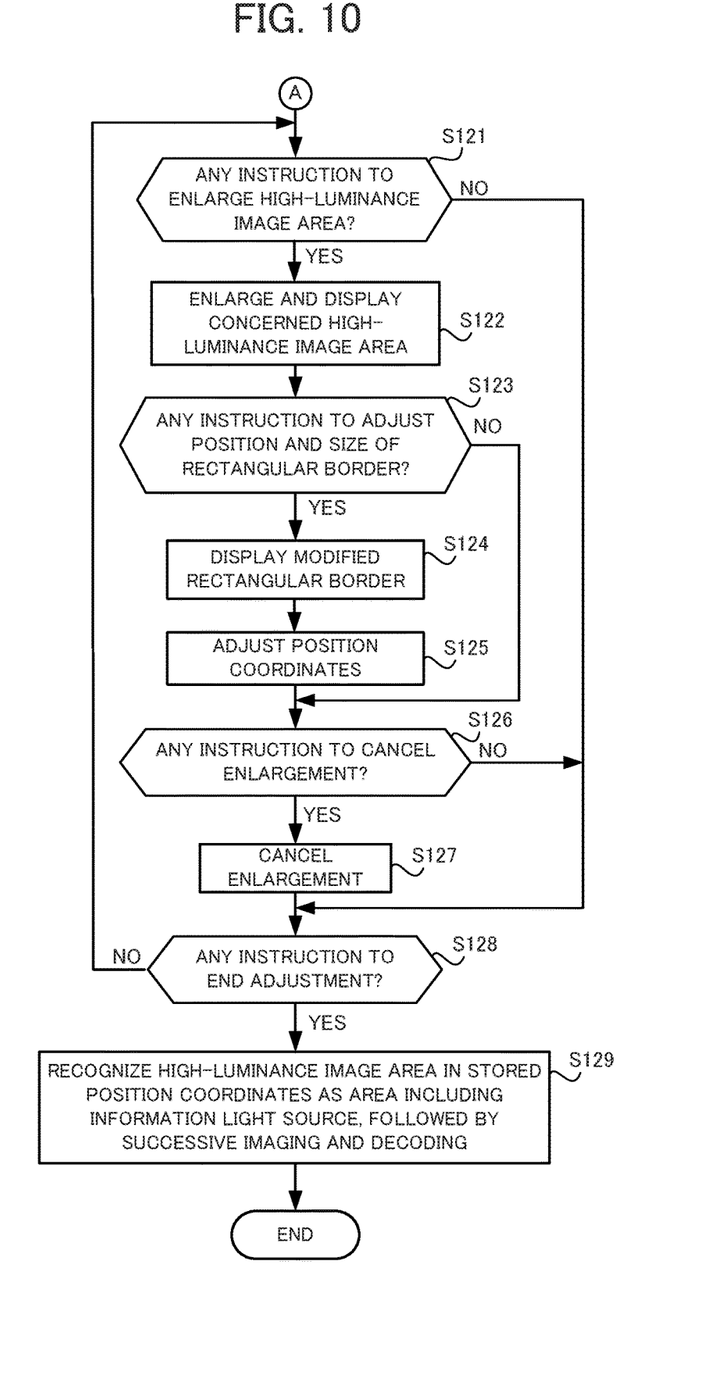
FIG. 10 is a flowchart illustrating the exemplary position coordinate setting process executed in the information processing apparatus according to the embodiment.

The operation of the information processing apparatus 100 will now be explained. FIGS. 9 and 10 are each a flowchart illustrating an exemplary position coordinate setting process executed in the information processing apparatus 100. The operation illustrated in FIGS. 9 and 10 may be executed at the initialization of the information processing apparatus 100, at regular intervals, or at an adjustment of the position of any monitoring target apparatus 200.

The operation illustrated in FIG. 9 will be explained. First, the image area detector 142 in the controller 102 inputs an image frame received from the image processor 104 (Step S101). Then, the image area detector 142 determines whether any high-luminance image area exists in the image frame (Step S102). The number of the high-luminance image area is not always one but may be two or more. If the image area detector 142 determines no high-luminance image area (Step S102; NO), the process following Step S101 is repeated.

In contrast, if determining any high-luminance image area (Step S102; YES), the image area detector 142 selects a high-luminance image area that has not yet been subject to the process following Step S104 (Step S103). The image area detector 142 then superimposes a rectangular border surrounding the selected high-luminance image area on the image displayed on the display 107 (Step S104).

The image area detector 142 then determines whether the high-luminance image area selected in Step S103 is equal to or larger than the predetermined size (Step S105). If determining that the high-luminance image area is smaller than the predetermined size (Step S105; NO), the image area detector 142 determines whether the high-luminance image area has the predetermined shape (Step S106).

If the image area detector 142 determines that the high-luminance image area has the predetermined shape (Step S106; YES), the position coordinate setter 140 stores the coordinates of the high-luminance image area in the image frame (coordinate plane) into the memory 105, as the coordinates (position coordinates) of the LEDs 202 serving as a light source that transmits information (Step S107).

In contrast, if the image area detector 142 determines that the high-luminance image area is equal to or larger than the predetermined size (Step S105; YES), the image area determiner 144 determines whether the high-luminance image area includes two or more high-luminance subject images disposed adjacent to or overlapping with each other (Step S108). If the image area determiner 144 determines that the high-luminance image area does not include two or more high-luminance subject images disposed adjacent to or overlapping with each other (Step S108; NO), the process following Step S103 is repeated. In contrast, if the image area determiner 144 determines that the high-luminance image area includes two or more high-luminance subject images disposed adjacent to or overlapping with each other (Step S108; YES), the enlargement controller 134 enlarges the region within the rectangular border surrounding the high-luminance image area determined to include two or more high-luminance subject images disposed adjacent to or overlapping with each other, and controls the display 107 to display the enlarged region (Step S109).

Then, the instruction detector 136 determines whether any subarea in the enlarged region within the rectangular border is designated by an operation of the user to the operation unit 106 (Step S110). If the instruction detector 136 determines designation of any subarea within the rectangular border (Step S110; YES), the image area detector 142 recognizes the designated subarea as a new high-luminance image area, and superimposes a new rectangular border surrounding the new high-luminance image area on the image displayed on the display 107 (Step S111). The position coordinate acquirer 138 then acquires the coordinates of the designated subarea in the image frame (coordinate plane). The position coordinate setter 140 then converts the acquired coordinates by the position coordinate acquirer 138 into the coordinates before the enlargement of the region within the rectangular border surrounding the high-luminance image area, and stores the converted coordinates into the memory 105 as the coordinates (position coordinates) of the LEDs 202 serving as a light source that transmits information (Step S112).

In contrast, if determining designation of no subarea within the rectangular border (Step S110; NO), the instruction detector 136 determines whether any instruction to cancel the enlargement is provided by an operation of the user to the operation unit 106 (Step S113). If the instruction detector 136 determines any instruction to cancel the enlargement (Step S113; YES), the process following Step S103 is repeated. In contrast, if the instruction detector 136 determines no instruction to cancel the enlargement (Step S113; NO), the process following Step S109 is repeated.

If the image area detector 142 determines that the high-luminance image area does not have the predetermined shape in Step S106 (Step S106; NO), after the storage of the position coordinates of the high-luminance image area in Step S107, or after the storage of the converted coordinates as the position coordinates in Step S112; then the image area detector 142 determines whether any high-luminance image area (unprocessed high-luminance image area) remains that has not yet been subject to the process following Step S104 (Step S114). If the image area detector 142 determines any unprocessed high-luminance image area (Step S114; YES), the process following Step S103 is repeated.

In contrast, if the image area detector 142 determines no unprocessed high-luminance image area (Step S114; NO), in other words, if the setting of the rectangular border and the storage of the position coordinates in Steps S104 to S112 have already been completed for all the high-luminance image areas detected in Step S102; then the instruction detector 136 determines whether any instruction to stop displaying a rectangular border is provided by an operation of the user to the operation unit 106 (Step S115). The instruction to stop displaying a rectangular border indicates both an instruction to stop displaying a single rectangular border and an instruction to stop displaying two or more rectangular borders.

If the instruction detector 136 determines any instruction to stop displaying the rectangular border (Step S115; YES), the image area detector 142 deletes the position coordinates of the high-luminance image area surrounded by the concerned rectangular border from the memory 105 in accordance with the instruction (Step S116).

If the instruction detector 136 determines no instruction to stop displaying the rectangular border (Step S115; NO), or after the deletion of the position coordinates in Step S116; then the process goes to the operation illustrated in FIG. 10. Then, the instruction detector 136 determines whether any instruction to enlarge a high-luminance image area is provided by an operation of the user to the operation unit 106 (Step S121). If the instruction detector 136 determines any instruction to enlarge a high-luminance image area (Step S121; YES), the enlargement controller 134 enlarges the region within the rectangular border surrounding the concerned high-luminance image area, and controls the display 107 to display the enlarged region (Step S122).

The image area detector 142 then determines whether any instruction to adjust the position and size of a rectangular border is provided by an operation of the user to the operation unit 106 (Step S123). If determining any instruction to adjust the position and size of a rectangular border (Step S123; YES), the image area detector 142 modifies the rectangular border in accordance with the instruction, and superimposes the modified rectangular border on the image displayed on the display 107 (Step S124). The position coordinate adjuster 146 then adjusts the position coordinates in accordance with the modification of the rectangular border (Step S125).

If the image area detector 142 determines no instruction to adjust the position and size of a rectangular border (Step S123; NO), or after the adjustment of the position coordinates in Step S125; then the instruction detector 136 determines whether any instruction to cancel the enlargement is provided by an operation of the user to the operation unit 106 (Step S126). If the instruction detector 136 determines any instruction to cancel the enlargement (Step S126; YES), the image area detector 142 cancels the enlargement of the region within the rectangular border surrounding the high-luminance image area, which is enlarged in Step S122 (Step S127).

If the instruction detector 136 determines no instruction to enlarge a high-luminance image area in Step S121 (Step S121; NO), if the instruction detector 136 determines no instruction to cancel the enlargement in Step S126 (Step S126; NO), or after the cancellation of the enlargement by the image area detector 142 in Step S127; then the instruction detector 136 determines whether any instruction to end the adjustment of the positions and sizes of the rectangular borders is provided by an operation of the user to the operation unit 106 (Step S128). If the instruction detector 136 determines no instruction to end the adjustment (Step S128; NO), the process following Step S121 is repeated. In contrast, if the instruction detector 136 determines any instruction to end the adjustment (Step S128; YES), the controller 102 recognizes the high-luminance image area corresponding to the stored position coordinates as the area including the information light source (LEDs 202). The controller 102 then controls bit data strings to be decoded from a variation in hue or luminance values in the stored position coordinates in image frames received sequentially in time after successive imaging by the imager 101, and thus acquires the transmitted information (Step S129).

As described above, in the information processing apparatus 100 according to the embodiment, the image area detector 142 in the controller 102 detects a high-luminance image area having a luminance value equal to or higher than the predetermined value, having a size equal to or larger than the predetermined size, and including two or more high-luminance subject images disposed adjacent to or overlapping with each other, from an input image frame. The enlargement controller 134 controls the detected high-luminance image area to be enlarged and displayed. If any instruction to designate a subarea within a rectangular border surrounding the enlarged high-luminance image area is provided from the user, the position coordinate acquirer 138 converts the coordinates of the subarea into the coordinates before the enlargement of the high-luminance image area, and stores the converted coordinates into the memory 105 as the coordinates (position coordinates) of the LEDs 202 serving as a light source that transmits information.

The high-luminance image area is enlarged if the area is determined to include two or more high-luminance subject images disposed adjacent to or overlapping with each other. This configuration allows the user to determine whether the high-luminance subject images are disposed adjacent to or overlap with each other, and to set the position coordinates of subareas including the respective high-luminance subject images. The configuration can thus ensure the setting of the LEDs 202 serving as light sources that transmit information.

If the high-luminance image area has the predetermined shape, the image area detector 142 stores the coordinates of the high-luminance image area into the memory 105 as the position coordinates. This configuration can prevent the coordinates of a high-luminance image area having a shape different from the LEDs 202 from being stored as the position coordinates, and can thus ensure the setting of the LEDs 202 serving as light sources that transmit information.

The enlargement controller 134 can enlarge the high-luminance image area designated by the user, regardless of whether the high-luminance image area includes two or more high-luminance subject images disposed adjacent to or overlapping with each other. In addition, the image area detector 142 can modify the rectangular border and the position coordinate adjuster 146 can adjust the position coordinates in accordance with an instruction from the user. This configuration can ensure the setting of the LEDs 202 serving as light sources that transmit information.

The above description of the embodiments and drawings should not be construed to limit the invention, and may be appropriately modified.

For example, in the above embodiments, the instruction detector 136 determines whether any instruction to cancel the enlargement is provided by an operation of the user to the operation unit 106 in Step S126 in FIG. 10. Alternatively, the instruction detector 136 may determine that an instruction for the enlargement is provided if any high-luminance image area is equal to or larger than the predetermined size. Furthermore, in the above embodiments, the enlargement controller 134 enlarges the region within the rectangular border surrounding the high-luminance image area determined to include two or more high-luminance subject images disposed adjacent to or overlapping with each other, and controls the display 107 to display the enlarged region. Alternatively, the user may determine whether the area includes two or more high-luminance subject images disposed adjacent to or overlapping with each other based on visual observation, and manually enlarge the area. In addition, the determinations in Steps S105 and S106 may each be replaced with a manual operation based on determination of the user.

In the above embodiments, the enlargement controller 134 detects a high-luminance image area having a luminance value equal to or higher than the predetermined value from the input image frame to recognize the LEDs 202 serving as the information light source. The LEDs 202, however, may be recognized by any other procedure. For example, in order to recognize the LEDs 202 emitting light having a predetermined hue value, the image area detector 142 may detect an image area having the predetermined hue value from the input image frame.

In the above embodiments, the position coordinate setting process in the information processing apparatus 100 is executed at the initialization, at regular intervals, or at a position adjustment. Alternatively, for example, the position coordinate setting process may be executed at the timing of change in the luminous environment between day and night. The execution of the position coordinate setting process at this timing is preferable, because the imager 101 sometimes fails to accurately recognize the luminescent colors of the LEDs 202 (202a to 202d) due to a difference in color temperature between the daytime luminous environment derived from daylight incident from windows of a building and the nighttime luminous environment derived from interior illumination. Accordingly, in the position coordinate setting process executed in response to a change in luminous environment, not only the position coordinates of the LEDs but also the respective color ranges of red (R), green (G), and blue (B) may be adjusted depending on the luminous environment (color temperature).

The information processing apparatus 100 may be any apparatus equipped with the imager 101 and capable of imaging. The imager 101 may also be provided outside the information processing apparatus 100.

In the above embodiments, the program to be executed may be stored for distribution in a non-transitory computer-readable recording medium, such as a flexible disk, a compact disc read-only memory (CD-ROM), a digital versatile disc (DVD), or a magneto-optical (MO) disc. In this case, this program is installed into a computer to configure a system executing the above-described process.

Alternatively, the program may be stored in a disk drive included in a certain information processing apparatus on a network, such as the Internet, and may be downloaded into a computer in the form of carrier waves, for example.

If the above functions are shared by an operating system (OS) or achieved by cooperation between the OS and application, only the data other than the OS may be stored in a medium for distribution or downloaded into a computer, for example.

The foregoing describes some example embodiments for explanatory purposes.

Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:
1. An information processing apparatus comprising:
an image input unit that inputs an image;

a display; and a processor that:
- enlarges an image area having a predetermined luminance value in the image input by the image input unit and controls the display to display the enlarged image area;
- designates any subarea included in the enlarged image area displayed on the display;
- acquires position coordinates of the designated subarea;
- converts the acquired position coordinates of the subarea into position coordinates of the image area having the predetermined luminance value before enlargement;
- sets the converted position coordinates as position coordinates of a light source that transmits information via visible light communication; and
- decodes a variation in luminance in the set position coordinates into the information transmitted via the visible light communication.

2. The information processing apparatus according to claim 1, wherein the processor:
- detects an image area having the predetermined luminance value, the image area being equal to or larger than a predetermined size, from the image input by the image input unit; and
- determines whether the detected image area includes two or more subject images having the predetermined luminance value and being disposed adjacent to or overlapping with each other, wherein
- if the detected image area is determined to include two or more subject images having the predetermined luminance value and being disposed adjacent to or overlapping with each other, the detected image area is enlarged and displayed.

3. The information processing apparatus according to claim 2, wherein the processor determines whether the image area having the predetermined luminance value has a predetermined shape.

4. The information processing apparatus according to claim 1, wherein the processor detects any subarea included in the enlarged image area displayed on the display in accordance an instruction provided by an external operation.

5. The information processing apparatus according to claim 4, wherein the processor adjusts the position coordinates of the light source in accordance with an instruction provided by an external operation.

6. An information processing method comprising:
- inputting an image in an image input step;
- enlarging an image area having a predetermined luminance value in the image input in the image input step and controlling a display to display the enlarged image area in a display control step;
- designating any subarea included in the enlarged image area displayed on the display in the display control step in a designation step;
- acquiring position coordinates of the subarea designated in the designation step in a position coordinate acquisition step;
- converting the position coordinates of the subarea acquired in the position coordinate acquisition step into position coordinates of the image area having the predetermined luminance value before enlargement, and setting the converted position coordinates as position coordinates of a light source that transmits information via visible light communication in a position coordinate setting step; and
- decoding a variation in luminance in the position coordinates set in the position coordinate setting step into the information transmitted via the visible light communication in a decoding step.

7. The information processing method according to claim 6, further comprising:
- detecting an image area having the predetermined luminance value, the image area being equal to or larger than a predetermined size, from the image input in the image input step in a first detection step; and
- determining whether the detected image area includes two or more subject images having the predetermined luminance value and being disposed adjacent to or overlapping with each other in a first determination step, wherein
- if the detected image area is determined to include two or more subject images having the predetermined luminance value and being disposed adjacent to or overlapping with each other, the detected image area is enlarged and displayed in the display control step.

8. The information processing method according to claim 7, further comprising:
- determining whether the image area having the predetermined luminance value has a predetermined shape in a second determination step.

9. The information processing method according to claim 6, further comprising:
- detecting any subarea included in the enlarged image area displayed on the display in accordance with an instruction provided by an external operation in a second detection step.

10. The information processing method according to claim 9, further comprising:
- adjusting the position coordinates of the light source in accordance with an instruction provided by an external operation in a position coordinate adjustment step.

11. A non-transitory computer-readable recording medium storing a program thereon, the program causing a computer to execute inputting an image;
- enlarging an image area having a predetermined luminance value in the image input and controlling the enlarged image area to be displayed;
- designating any subarea included in the enlarged image area;
- acquiring position coordinates of the subarea;
- converting the position coordinates of the subarea into position coordinates of the image area having the predetermined luminance value before enlargement, and setting the converted position coordinates as position coordinates of a light source that transmits information via visible light communication; and
- decoding a variation in luminance in the position coordinates into the information transmitted via the visible light communication.

* * * * *